(12) United States Patent
Maeda et al.

(10) Patent No.: US 9,626,573 B2
(45) Date of Patent: Apr. 18, 2017

(54) TRAFFIC LANE MARKING RECOGNITION APPARATUS AND TRAFFIC LANE MARKING RECOGNITION PROGRAM

(71) Applicant: DENSO CORPORATION, Kariya, Aichi-pref. (JP)

(72) Inventors: Yuu Maeda, Ichinomiya (JP); Shunsuke Suzuki, Aichi-ken (JP); Yusuke Ueda, Okazaki (JP); Kazuhisa Ishimaru, Nagoya (JP); Osamu Shimomura, Okazaki (JP); Naoki Kawasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/806,361

(22) Filed: Jul. 22, 2015

(65) Prior Publication Data

US 2016/0026879 A1 Jan. 28, 2016

(30) Foreign Application Priority Data

Jul. 23, 2014 (JP) ................................ 2014-150095
Nov. 7, 2014 (JP) ................................ 2014-227240

(51) Int. Cl.
*G06K 9/00* (2006.01)
*G06F 19/00* (2011.01)

(52) U.S. Cl.
CPC ............................. *G06K 9/00798* (2013.01)

(58) Field of Classification Search
USPC ....... 382/100, 103–108, 151, 155, 162, 168, 382/172, 173, 181, 190–199, 209, 219,
(Continued)

(56) References Cited

U.S. PATENT DOCUMENTS 7,894,632 B2* 2/2011 Park ................... G06K 9/00798
382/104
2005/0270374 A1* 12/2005 Nishida ................ G05D 1/0246
348/148

(Continued)

FOREIGN PATENT DOCUMENTS

JP H11-175702 A 7/1999
JP 2003-067755 3/2003
(Continued)

*Primary Examiner* — Seyed Azarian
(74) *Attorney, Agent, or Firm* — Knobbe, Martens, Olson & Bear, LLP

(57) ABSTRACT

A traffic lane marking recognition apparatus includes a candidate detecting unit, a gap detecting unit, and a recognition reducing unit. The candidate detecting unit detects a lane dividing line candidate which is a candidate for a lane dividing line that defines a traffic lane on a road, based on an image of the road captured by an on-board camera that is mounted in a vehicle. The gap detecting unit detects a gap included in the lane dividing line candidate detected by the candidate detecting unit. When the gap is detected by the gap detecting unit, the recognition reducing unit reduces a probability of recognition of the lane dividing line candidate as a lane dividing line to a first probability that is lower than the probability when the gap detecting unit does not detect the gap, in a region from the gap closest to the vehicle towards a direction away from the vehicle.

19 Claims, 9 Drawing Sheets

(58) Field of Classification Search
USPC ....... 382/232, 254, 266, 274, 276, 287–291,
382/305, 312; 348/148; 701/117
See application file for complete search history.

(56) References Cited

U.S. PATENT DOCUMENTS

2006/0239509 A1\* 10/2006 Saito .................... G06K 9/6205
382/104
2009/0157286 A1\* 6/2009 Saito .................... B60W 30/16
701/117

FOREIGN PATENT DOCUMENTS

JP   2013-012044   1/2013
JP   2014-189079   10/2014

\* cited by examiner

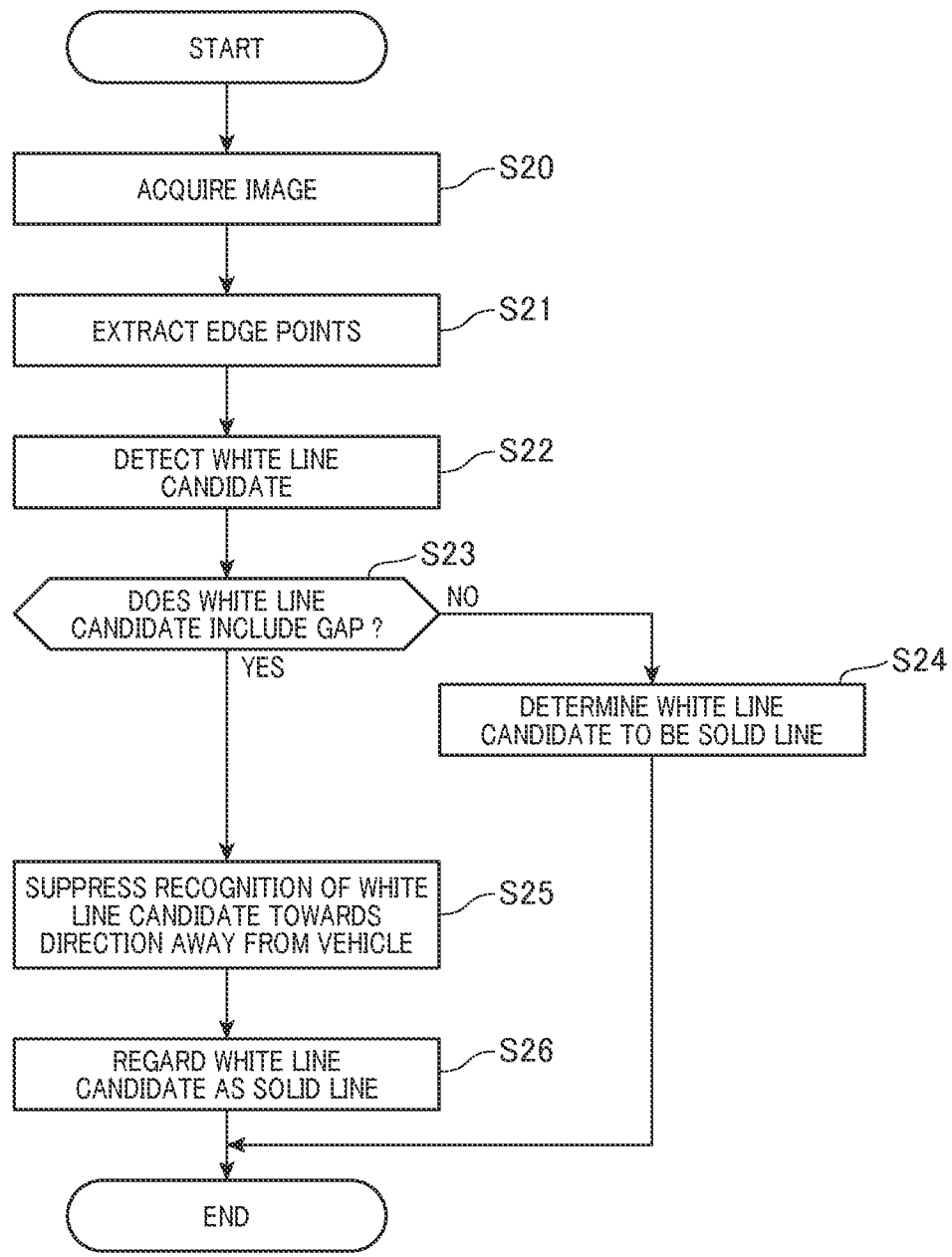

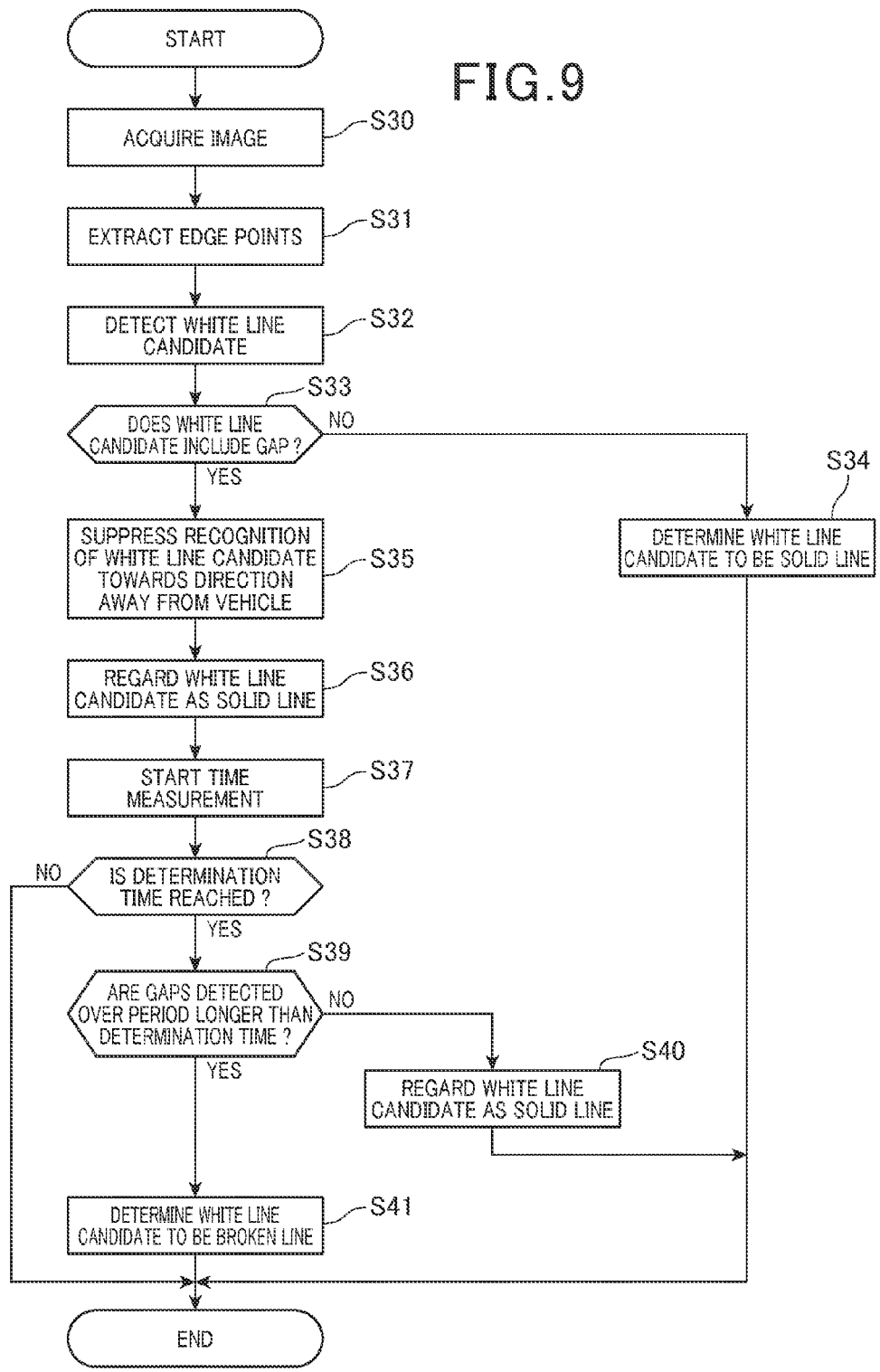

TRAFFIC LANE MARKING RECOGNITION APPARATUS AND TRAFFIC LANE MARKING RECOGNITION PROGRAM

CROSS-REFERENCE TO RELATED APPLICATION

This application is based on and claims the benefit of priority from Japanese Patent Application Nos. 2014-150095, filed Jul. 23, 2014, and 2014-227240, filed Nov. 7, 2014, the disclosures of which are incorporated herein in its entirety by reference.

BACKGROUND

[Technical Field]

The present invention relates to an apparatus that recognizes a lane dividing line (lane markings) such as a white line on a road, based on images from an on-board camera for driving assistance and the like of a vehicle, and a program thereof.

[Related Art]

An apparatus is proposed that recognizes a lane dividing line (lane markings) such as a white line on a road from images captured by an on-board camera and performs driving assistance and the like of a vehicle, based on the recognized lane dividing line on the road. In an apparatus such as this, appropriate recognition of the lane dividing line on the road even in a tunnel is desired.

In a vehicle lane line detection apparatus described in JP-A-H11-075702, to detect a lane dividing line for vehicles from acquired road images both inside a tunnel and outside the tunnel where brightness differs, images having high exposure are used inside the tunnel and images having low exposure are used outside the tunnel.

In general, a white line (lane dividing line) inside a tunnel tends to darken as a result of exhaust gas. When the white line darkens and becomes blurred, fluorescent portions of pole-shaped cones or the like located along the white line tend to be erroneously recognized as the white line. When the fluorescent portions of the pole-shaped cones or the like are erroneously recognized as the white line, vehicle control is performed based on the apparent positions of the fluorescent portions of the pole-shaped cones or the like.

Therefore, for example, when lane keeping control is performed, steering is aimed towards a target that is shifted from the intended steering target, and passengers may experience discomfort. Such issues are not solved even by the detection apparatus described in JP-A-H11-175702.

The above-described issue is not limited to the inside of a tunnel. The white line may become blurred even outside of a tunnel, and the above-described issue arises when the white line becomes blurred, regardless of whether the white line is inside or outside of a tunnel.

SUMMARY

It is thus desired to provide a traffic lane marking recognition apparatus that is capable of improving the stability of traffic lane marking recognition while suppressing erroneous recognition of traffic lane markings. In addition, it is also desired to provide a traffic lane marking recognition apparatus that is capable of suppressing unstable driving assistance control accompanying erroneous recognition of traffic lane markings upon entry into a tunnel.

A first exemplary embodiment provides a traffic lane marking recognition apparatus that includes: a candidate detecting unit that detects a lane dividing line candidate that is a candidate for a lane dividing line that defines a traffic lane on a road, based on an image of the road captured by an on-board camera that is mounted in a vehicle; a gap detecting unit that detects a gap in the lane dividing line candidate detected by the candidate detecting unit; and a recognition reducing unit that, when the gap detecting unit detects the gap, reduces a probability of recognition of the lane dividing line candidate as a lane dividing line from the gap closest to the vehicle towards a direction away from the vehicle to a first probability that is lower than the probability when the gap detecting unit does not detect the gap.

In the first exemplary embodiment, the lane dividing line candidates for a traffic lane are detected. When a gap in the detected lane dividing line candidate is detected, the probability of recognition of the lane dividing line candidate as a lane dividing line from the gap closest to the vehicle toward the direction away from the vehicle is reduced to a first probability that is lower than the probability when a gap is not detected. In other words, in the detected lane dividing line candidate, the probability of recognition as a lane dividing line is not reduced in a portion that appears as a solid line near the vehicle, and the probability is reduced in a portion from the gap closest to the vehicle towards the direction away from the vehicle.

When only a lane dividing line on one side of a traffic lane is recognized, recognition may become more unstable than when the lane dividing lines on both sides of a traffic lane are recognized, because the recognition is dependent on the accuracy of recognition of the lane dividing line on one side. Therefore, even when the lane dividing line candidate includes a gap, the above-described probability is not reduced regarding a portion of the lane dividing line candidate that appears to be a solid line near the vehicle. As a result, the lane dividing lines on both sides can be recognized near the vehicle, and therefore, the stability of traffic lane marking recognition can be improved while suppressing erroneous recognition of markings.

A second exemplary embodiment provides a traffic lane marking recognition apparatus that includes: a tunnel determining unit that determines whether or not the vehicle is inside a tunnel; a detecting unit that detects a lane dividing line candidate that is a candidate for a lane dividing line that defines a traffic lane on a road, based on an image of the road captured by an on-board camera; a line type identifying unit that identifies a line type of the lane dividing line candidate detected by the detecting unit; and a recognition reducing unit that reduces a probability of recognition of a first lane dividing line candidate as a lane dividing line, when the tunnel determining unit determines that the vehicle is inside a tunnel, and the line type of the first lane dividing line candidate that is identified by the line type identifying unit differs from the line type of a second lane dividing line candidate that is identified on the same side as the first lane dividing line candidate in relation to the vehicle, from a predetermined distance before the vehicle is determined to be inside a tunnel until the vehicle is determined to be inside the tunnel.

In the second exemplary embodiment, whether or not the vehicle is inside a tunnel is determined. In addition, the lane dividing line candidate for a traffic lane is detected and the line type of the detected lane dividing line candidate is identified based on an image of the road captured by the on-board camera.

In general, the line type of a lane dividing line is continuously the same outside a tunnel and inside the tunnel near the tunnel entrance. When the identified line type of a lane dividing line candidate differs outside the tunnel and inside the tunnel, the likelihood is high that the lane dividing line inside the tunnel is blurred. Blurring of a lane dividing line inside a tunnel causes erroneous recognition of fluorescent portions of pole-shaped cones or the like as a white line. Therefore, when the vehicle is determined to be inside a tunnel, and the line type of the first lane dividing line candidate differs from the line type of the second lane dividing line candidate identified on the same side as the first lane dividing line candidate in relation to the vehicle before entry into the tunnel, the probability of recognition of the first lane dividing line candidate as a lane dividing line is reduced. As a result, instability of driving assistance control resulting from erroneous recognition of a lane dividing line upon entry into a tunnel can be suppressed.

A third exemplary embodiment provides a traffic lane marking recognition apparatus that includes: a tunnel determining unit that determines whether or not the vehicle is inside a tunnel; a detecting unit that detects a lane dividing line candidate that is a candidate for a lane dividing line that defines a traffic lane on a road, based on an image of the road captured by an on-board camera; a lane width estimating unit that estimates a lane width from left and right lane dividing line candidates detected by the detecting unit; and a recognition reducing unit that reduces the probability of recognition of a lane dividing line candidate in the center of the road as a lane dividing line, when the tunnel determining unit determines that the vehicle is inside a tunnel, and the lane width estimated by the lane width estimating unit differs so as to exceed a first predetermined value from the lane width estimated from a predetermined distance before the vehicle is determined to be inside a tunnel until the vehicle is determined to be inside the tunnel.

In the third exemplary embodiment, whether or not the vehicle is inside a tunnel is determined. In addition, a lane dividing line candidate for a traffic lane is detected, and the lane width is estimated from left and right lane dividing line candidates that have been detected, based on an image of the road captured by the on-board camera.

In general, the lane width is substantially the same outside a tunnel and inside the tunnel near the tunnel entrance. When the lane width inside the tunnel differs so as to exceed the first predetermined value from the lane width outside the tunnel, the likelihood is high that the lane dividing line inside the tunnel is blurred, and the fluorescent portions of the pole-shaped cones or the like are erroneously recognized as the lane dividing line candidate. Therefore, when the vehicle is determined to be inside a tunnel, and the estimated lane width differs so as to exceed the first predetermined value from the lane width estimated before entry into the tunnel, the probability of recognition of the lane dividing line candidate in the center of the road as a lane dividing line is reduced. As a result, instability of driving assistance control resulting from erroneous recognition of a lane dividing line upon entry into a tunnel can be suppressed.

A fourth exemplary embodiment provides a traffic lane marking recognition apparatus that includes: a tunnel determining unit that determines whether or not the vehicle is inside a tunnel; a detecting unit that detects a lane dividing line candidate that is a candidate for a lane dividing line that defines a traffic lane on a road, based on an image of the road captured by an on-board camera; a degree-of-parallel calculating unit that calculates a degree of parallel between left and right lane dividing line candidates detected by the detecting unit; and a recognition reducing unit that reduces the probability of recognition of a lane dividing line candidate in the center of the road as a lane dividing line, when the tunnel determining unit determines that the vehicle is inside a tunnel, and the degree of parallel calculated by the degree-of-parallel calculating unit is lower so as to exceed a second predetermined value than the degree of parallel calculated from a predetermined distance before the vehicle is determined to be inside a tunnel until the vehicle is determined to be inside the tunnel.

In the fourth exemplary embodiment, whether or not the vehicle is inside a tunnel is determined. In addition, a lane dividing line candidate for a traffic lane is detected, and the degree of parallel between left and right lane dividing line candidates that have been detected is calculated, based on an image of the road captured by the on-board camera.

In general, the degree of parallel between left and right lane dividing lines is substantially the same outside a tunnel and inside the tunnel near the tunnel entrance. When the degree of parallel between the left and right markings inside the tunnel is lower so as to exceed the second predetermined value from the degree of parallel outside the tunnel, the likelihood is high that the lane dividing line inside the tunnel is blurred, and the fluorescent portions of the pole-shaped cones or the like are erroneously recognized as the lane dividing line candidate.

Therefore, when the vehicle is determined to be inside a tunnel, and the calculated degree of parallel between the lane dividing line candidates is lower so as to exceed the second predetermined value than the degree of parallel between the lane dividing line candidates calculated before entry into the tunnel, the probability of recognition of the lane dividing line candidate in the center of the road as a lane dividing line is reduced. As a result, instability of driving assistance control resulting from erroneous recognition of a lane dividing line upon entry into a tunnel can be suppressed.

BRIEF DESCRIPTION OF THE DRAWINGS

In the accompanying drawings:

FIG. 8 is a flowchart showing a process for recognizing a white line; and

FIG. 9 is a flowchart showing a process for recognizing a white line.

DESCRIPTION OF EMBODIMENTS

Each embodiment actualizing a traffic lane marking recognition apparatus will hereinafter be described with reference to the drawings. The traffic lane markings recognized by the traffic lane marking recognition apparatus according to each embodiment are used for driving assistance, such as lane keeping assist control (LKA control) and lane deviation warning.

(First Embodiment)

Figure 1:
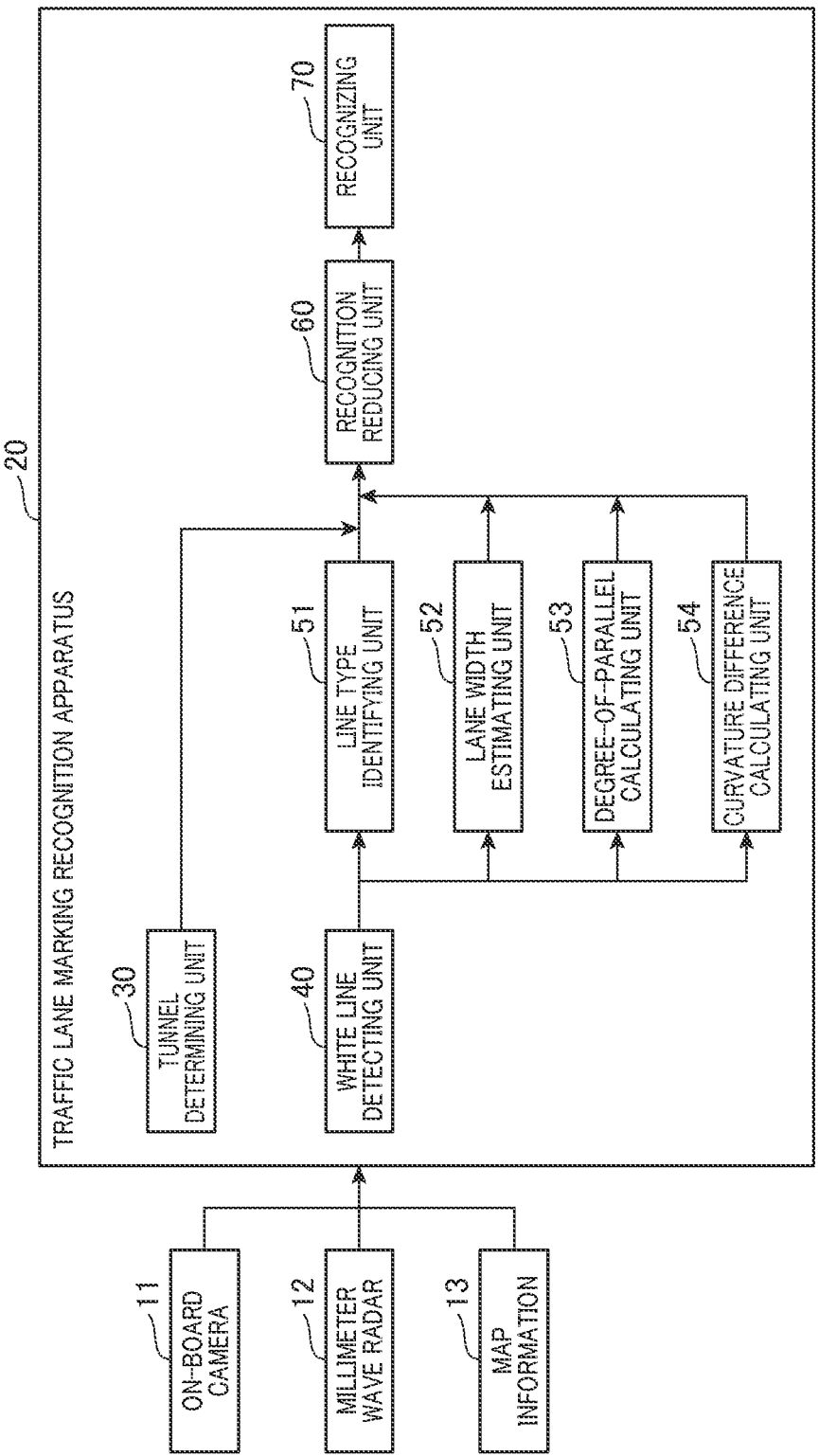
FIG. 1 is a block diagram showing a configuration of a traffic lane marking recognition apparatus according to a first embodiment.

First, a configuration of a traffic lane marking recognition apparatus 20 according to the present embodiment will be described with reference to FIG. 1. The traffic lane marking recognition apparatus 20 according to the present embodiment is an on-board apparatus that recognizes white lines (corresponding to lane dividing lines or lane markings) that define traffic lanes on a road, using images captured by an on-board camera 11.

Figure 2:
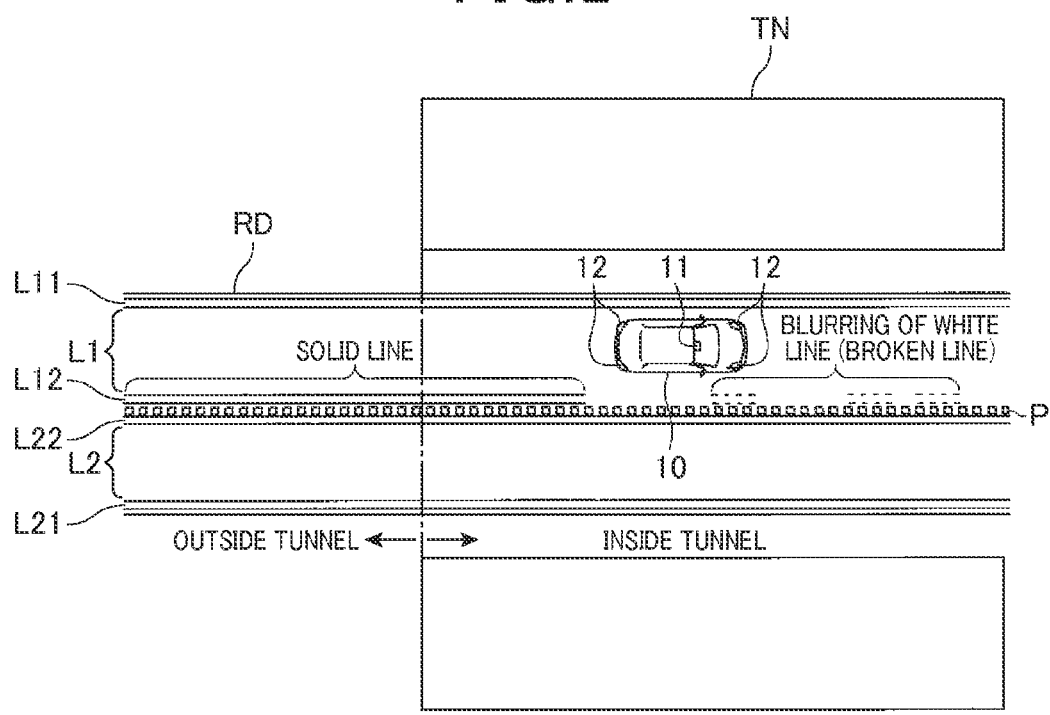
FIG. 2 is a diagram showing the state of a white line outside and inside a tunnel.

The on-board camera 11 is configured by at least one of a charge coupled device (CCD) camera, a complementary metal-oxide-semiconductor (CMOS) image sensor, a near infrared camera, and the like. As shown in FIG. 2, the on-board camera 11 is mounted in a vehicle 10 so as to capture images of the peripheral environment including the road ahead of the vehicle 10. Specifically, the on-board camera 11 is set near the upper end of the front windshield of the vehicle 10 and captures images of an area that spreads over a predetermined angle range ahead of the vehicle 10. The on-board camera 11 may also be configured by a stereo camera or a plurality of cameras.

The traffic lane marking recognition apparatus 20 is a computer that includes a central processing unit (CPU), a random access memory (RAM), a read-only memory (ROM), an input/output (I/O), and the like. The CPU actualizes the various functions of a tunnel determining unit 30, a white line detecting unit 40, a line type determining unit 51, a lane width estimating unit 52, a degree-of-parallel calculating unit 53, a curvature difference calculating unit 54, a recognition reducing unit 60, and a recognizing unit 70, by running a traffic lane marking recognition program installed in the ROM. A traffic lane marking recognition program that is stored in a storage medium may also be loaded onto the computer. Each unit will be described hereafter.

Exhaust gas is not washed away by rain inside a tunnel, and then, the white line tends to darken and become blurred by the exhaust gas. As shown in FIG. 2, the white line in the center of the road, in particular, tends to become darker than the white lines on the edges of the road. When the road inside a tunnel TN is composed of two opposing lanes L1 and L2 (in FIG. 2, the lane L1 is defined by left-hand and right-hand white lines L11 and L12, and the lane L2 is defined by left-hand and right-hand white lines L21 and L22), pole-shaped cones P are often set along the white line (in FIG. 2, corresponding to the right-hand white line L12 in the lane L1 and the right-hand white line L22 in the lane L2) in the median strip or a temporary common area in the center of the road RD. Most pole-shaped cones P have fluorescent portions to improve visibility. The fluorescent portions are extracted as edge points because, like the white line, the luminance thereof is higher than that of the periphery.

Figure 3:
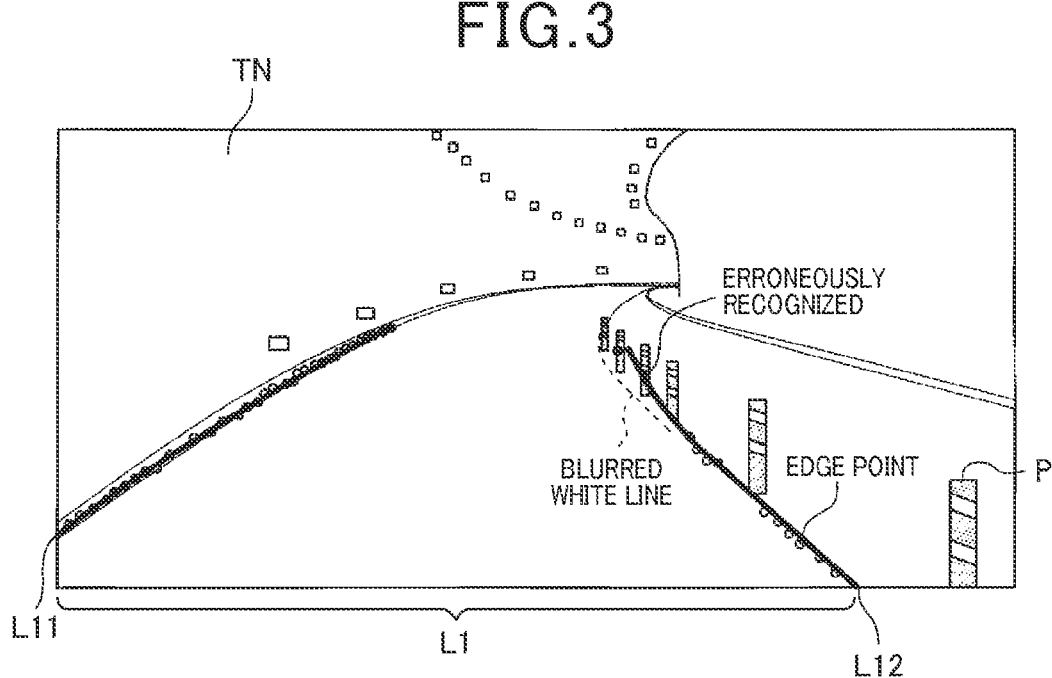
FIG. 3 is a diagram showing an aspect of erroneous recognition of a white line inside a tunnel.

Therefore, as shown in FIG. 3, when the white line is blurred, the fluorescent portions of the pole-shaped cones P may be detected as part of a white line candidate and erroneously recognized as a white line. In FIG. 3, the circle marks indicate extracted edge points.

When the fluorescent portions of the pole-shaped cones P are erroneously recognized as a white line, driving assistance control is performed based on the apparent positions of the fluorescent portions of the pole-shaped cones P. Therefore, when LKA control is performed, steering is aimed towards a target that is shifted from the intended steering target. When lane deviation warning is performed, a warning is not issued even when the vehicle 10 deviates from the intended lane towards the pole-shaped cones P.

In addition, even when the pole-shaped cones P are not set in the center of the road inside the tunnel, when the white line is blurred, an oncoming vehicle may be detected and erroneously recognized as a white line. Therefore, the traffic lane marking recognition apparatus 20 suppresses erroneous recognition of white lines and suppresses instability of driving assistance control upon entry into the tunnel by actualizing the functions of the above-described units.

White lines may also become blurred outside of a tunnel. However, the white lines in the center of the road inside the tunnel are particularly prone to becoming soiled and blurred. In addition, the pole-shaped cones P that tend to be erroneously recognized as a white line are often set in the center of the road inside a tunnel. Therefore, the importance of measures against the blurring of white lines inside a tunnel is higher than that of measures against blurring outside a tunnel.

The tunnel determining unit 30 determines whether or not the vehicle 10 is inside a tunnel. Specifically, the tunnel determining unit 30 makes the determination using at least one of an image captured by the on-board camera 11, the distance to an object near the vehicle 10 measured by a millimeter wave radar 12, and map information 13. As shown in FIG. 2, millimeter wave radars 12 are set, for example, in the front left, front right, rear left, and rear right of the vehicle 10, and are sensor that measure the distance to an object near the vehicle 10. As a sensor that measures the distance to an object near the vehicle 10, a laser radar or an ultrasonic sensor may also be used instead of the millimeter wave radar 12.

The white line detecting unit 40 extracts edge points based on the image of the periphery of the vehicle 10 captured by the on-board camera 11, and calculates a plurality of left and right white line candidates (lane dividing line candidates) from the extracted edge points. The white line detecting unit 40 then selects and detects the white line candidates having the highest likeness to a white line among the calculated plurality of left and right white line candidates.

The line type identifying unit 51 identifies the line type of the white line candidate detected by the white line detecting unit 40. Specifically, the process for identifying the line type performed by the white line detecting unit 40 includes a process for identifying whether the white line candidate is a solid line or a broken line, and a process for identifying whether or not the white line candidate is a composite line. The composite line is composed of a plurality of lines, such as two or three lines, that are aligned in parallel. There are a plurality of types of composite lines, such as a double line, a triple line, and a multiplex line of solid and broken lines. Here, the process for identifying the line type performed by the line type identifying unit 51 includes a process for identifying the type of composite line, when the white line candidate is a composite line.

The lane width estimating unit 52 estimates the lane width from the distance between the left-hand and right-hand white line candidates detected by the white line detecting unit 40. The degree-of-parallel calculating unit 53 calculates the degree of parallel between the white line candidates detected by the white line detecting unit 40. The curvature difference calculating unit 54 calculates the curvature difference between the left-hand and right-hand white line candidates detected by the white line detecting unit 40.

In general, the continuity of a white line is high outside and inside a tunnel near the tunnel entrance. When the continuity of a detected white line candidate is low outside and inside the tunnel near the tunnel entrance, an object other than the white line may be erroneously recognized as the white line. Therefore, the recognition reducing unit 60 reduces the probability of recognition of a white line candidate that has low continuity outside and inside a tunnel as a white line.

According to the present embodiment, the recognition reducing unit 60 eliminates a white line candidate that has low continuity outside and inside a tunnel from the recognition targets (sets the probability of recognition of the white line candidate as a white line to zero). The recognition reducing unit 60 will be described in detail below.

The recognition reducing unit 60 performs the following process in a state in which the tunnel determining unit 30 has determined that the vehicle 10 is inside a tunnel. When the line type of a first white line candidate identified by the line type identifying unit 51 (the line type of a white line candidate identified inside the tunnel) differs from the line type of a second white line candidate identified on the same side in relation to the vehicle 10 (the line type of a white line identified before the tunnel) from a predetermined distance before the vehicle 10 is determined to be inside the tunnel until the vehicle 10 is determined to be inside the tunnel, the recognition reducing unit 60 reduces the probability of recognition of the first white line candidate as a white line. The same side in relation to the vehicle 10 indicates the same side in terms of the right side or the left side of the vehicle 10.

Specifically, the recognition reducing unit 60 reduces the probability of recognition of the first white line candidate as a white line, when the first white line candidate is identified as being a broken line, and the second white line candidate is identified as being a solid line, or when the first white line candidate is identified as being a line other than a composite line and the second white line candidate is identified as being a composite line.

Furthermore, the recognition reducing unit 60 reduces the probability of recognition of the first white line candidate as a white line when the first white line candidate is identified as being a first composite line and the second white line candidate is identified as being a second composite line of a different type than the first composite line. Examples of first and second composite lines include the first composite line being a double line and the second composite line being a triple line, the first composite line being a double broken line and the second composite line being a double solid line, and the like.

In general, the line type of a white line is the same outside and inside a tunnel near the tunnel entrance. When a white line candidate that is determined to be a solid line outside the tunnel near the tunnel entrance is determined to be a broken line inside the tunnel, the likelihood is high that a solid white line inside the tunnel has become blurred and is being detected as a broken white line candidate. In addition, when a white line candidate that is determined to be a composite line outside the tunnel near the tunnel entrance is determined to be a line other than a composite line inside the tunnel, the likelihood is high that the white line that is a composite line inside the tunnel has become blurred and is being detected as a solid or broken white line candidate.

Furthermore, when a white line candidate that is determined to be a composite line of a double solid line outside the tunnel near the tunnel entrance is determined to be a composite line of a double broken line inside the tunnel, the likelihood is high that the composite line of a double solid line inside the tunnel has become blurred and is being detected as a composite line of a double broken line. Therefore, the recognition reducing unit 60 reduces the probability of recognition of the first white line candidate as a white line in foregoing cases.

Furthermore, the recognition reducing unit 60 performs the following three processes in a state in which the tunnel determining unit 30 has determined that the vehicle 10 is inside a tunnel. The recognition reducing unit 60 reduces the probability of recognition of a white line candidate in the center of the road as a white line when the lane width estimated by the lane width estimating unit 52 differs so as to exceed a first predetermined value (particularly when wider) from the lane width estimated from a predetermined distance before the vehicle 10 is determined to be inside the tunnel until the vehicle 10 is determined to be inside the tunnel.

In addition, the recognition reducing unit 60 reduces the probability of recognition of a white line candidate in the center of the road as a white line when the degree of parallel calculated by the degree-of-parallel calculating unit 53 is lower so as to exceed a second predetermined value than the degree of parallel estimated from a predetermined distance before the vehicle 10 is determined to be inside the tunnel until the vehicle 10 is determined to be inside the tunnel.

Furthermore, the recognition reducing unit 60 reduces the probability of recognition of a white line candidate in the center of the road as a white line when the curvature difference calculated by the curvature difference calculating unit 54 differs so as to exceed a third predetermined value from the curvature difference calculated from a predetermined distance before the vehicle 10 is determined to be inside the tunnel until the vehicle 10 is determined to be inside the tunnel. The degree of parallel is the highest when the white line candidates are perfectly parallel.

In general, the lane width is substantially the same and does not suddenly change outside and inside a tunnel near the tunnel entrance. In addition, in general, the left and right white lines are parallel regardless of being inside or outside a tunnel, and the degree of parallel and the curvature difference between the left and right white lines do not suddenly change inside and outside a tunnel.

When the lane width estimated inside the tunnel is suddenly wider than the lane width estimated outside the tunnel near the tunnel entrance, the likelihood is high that the white line inside the tunnel has become blurred and the fluorescent portions of the pole-shaped cones P or the like is being detected as the white line candidate.

The same also applies when the degree of parallel between the left and right white line candidates inside the tunnel is suddenly lower than the degree of parallel outside the tunnel near the tunnel entrance, and when the curvature difference between the left and right white line candidates inside the tunnel suddenly changes from the curvature difference outside the tunnel near the tunnel entrance. Furthermore, inside a tunnel, the white line in the center of the road is more prone to blurring than the white lines on the edges.

Therefore, when the vehicle 10 is determined to be inside a tunnel and any of three cases described above apply, the recognition reducing unit 60 reduces the probability of recognition of the white line candidate in the center of the road as a white line. The predetermined distance is a distance near the tunnel entrance. The first predetermined value, the second predetermined value, and the third predetermined value are values enabling the determination to be made that the white line candidate detected outside the tunnel near the tunnel entrance and the white line candidate detected inside the tunnel are not continuous.

The recognizing unit 70 recognizes a white line candidate that has not been eliminated as a recognition target by the recognition reducing unit 60, among the white line candidates detected by the white line detecting unit 40, as a white line.

Figure 4:
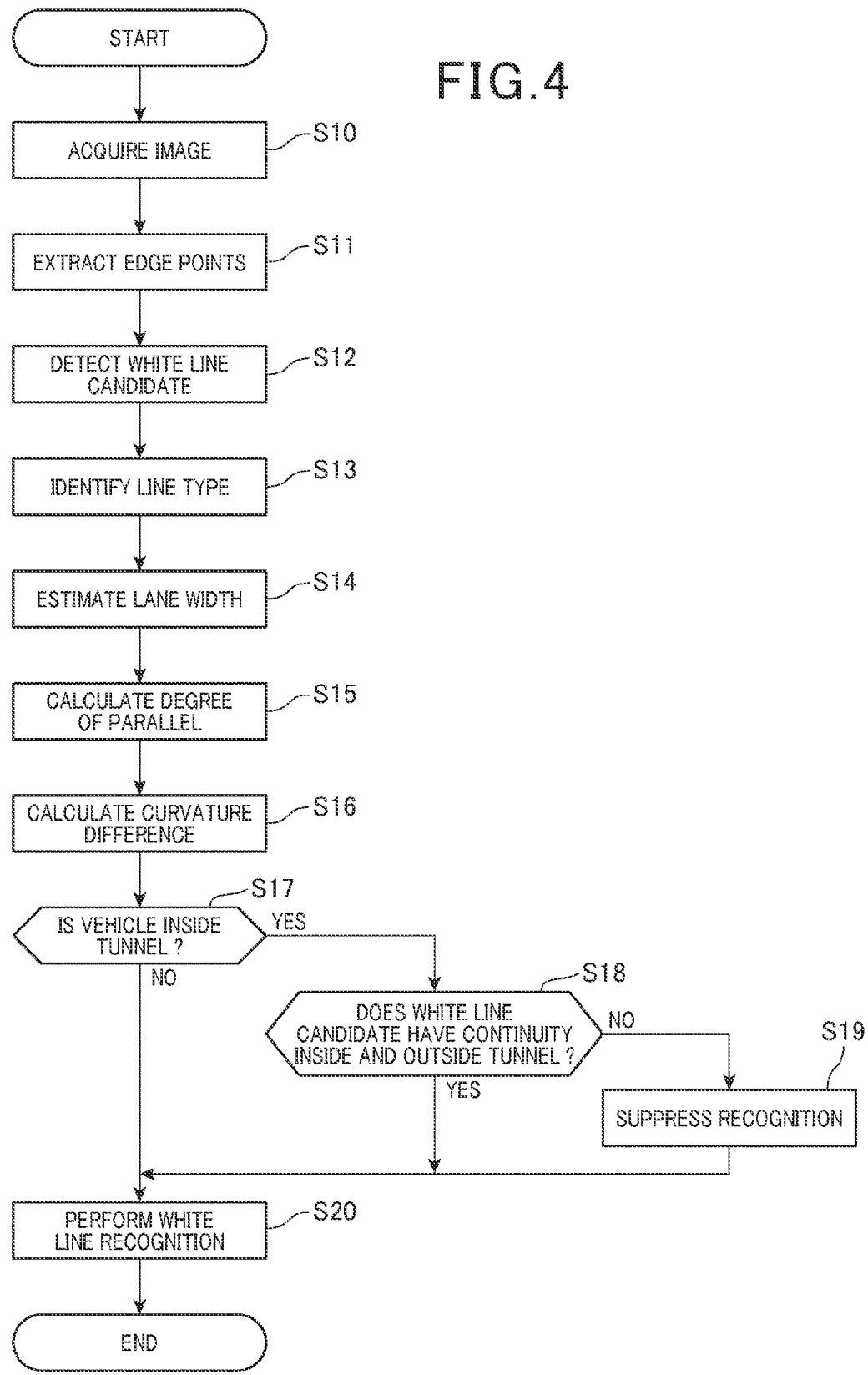
FIG. 4 is a flowchart showing a process for recognizing a white line.

Next, a process for recognizing a white line will be described with reference to the flowchart in FIG. 4. The process is repeatedly performed by the traffic lane marking recognition apparatus 20.

First, the traffic lane marking recognition apparatus 20 acquires an image captured by the on-board camera 11 (step S10). Next, the traffic lane marking recognition apparatus 20 applies a Sobel filter or the like on the image acquired at step S10 and extracts edge points of which the luminance significantly changes in the horizontal direction of the image (step S11). Then, the traffic lane marking recognition apparatus 20 performs Hough transform or the like on the edge points extracted at step S11, and calculates a plurality of white line candidates that are candidates for the left and right white lines.

When a plurality of parallel lines that pass through the extracted edge points are calculated within a predetermined distance in the width direction of the vehicle 10, on the same side in relation to the vehicle 10, the traffic lane marking recognition apparatus 20 sets the plurality of calculated lines as a single white line candidate.

The traffic lane marking recognition apparatus 20 then detects the white line candidate having the highest likeness to a white line from the calculated white line candidates (step S12). The white line candidate having the highest likeness to a white line refers to a white line candidate that has a plurality of features of a white line, to the highest extent. The plurality of features of a white line include edge strength being higher than a threshold, the edge points being aligned in substantially the same direction, and the like.

Next, the traffic lane marking recognition apparatus 20 identifies the line type of the white line candidate detected at step S12 (step S13). When the left and right white line candidates are detected, the traffic lane marking recognition apparatus 20 identifies the line type of each white line candidate.

For example, the traffic lane marking recognition apparatus 20 determines that the white line candidate is a solid line when the number of edge points included in the detected white line candidate is greater than a predetermined quantity, and determines that the white line candidate is a broken line when the number of edge points is less than the predetermined quantity.

Alternatively, the traffic lane marking recognition apparatus 20 may determine that the white line candidate is a solid line when a recognition distance barely changes over time, and determine that the white line candidate is a broken line when the recognition distance changes significantly over time. The recognition distance refers to the distance to the farthest recognizable edge point included in the white line candidate.

In addition, when a plurality of parallel lines that pass through the detected edge points are calculated within a predetermined distance in the width direction of the vehicle 10 on the same side in relation to the vehicle 10, the traffic lane marking recognition apparatus 20 determines that the white line candidate is a composite line and further identifies the type of composite line.

Then, the traffic lane marking recognition apparatus 20 estimates the lane width from the left and right white line candidates detected at step S12 (step S14). The traffic lane marking recognition apparatus 20 estimates the distance between the left and right white line candidates in the width direction of the vehicle 10 as the lane width.

Next, the traffic lane marking recognition apparatus 20 calculates the degree of parallel from the left and right white line candidates detected at step S12 (step S15). The traffic lane marking recognition apparatus 20 calculates the respective yaw rates of the left and right white line candidates, and calculates the degree of parallel between the left and right white line candidates to be higher as the difference between the calculated left and right yaw rates becomes smaller. The degree of parallel is the highest when the difference between the left and right yaw rates is zero.

Next, the traffic lane marking recognition apparatus 20 calculates the difference in curvature between the left and right white line candidates detected at step S12 (step S16). For example, the curvature is a positive value when the white line candidate curves to the left, and a negative value when the white line candidate curves to the right. The traffic lane marking recognition apparatus 20 calculates the respective curvatures of the left and right white line candidates, and calculates the difference between the curvature of the left white line candidate and the curvature of the right white line candidate.

Next, the traffic lane marking recognition apparatus 20 determines whether or not the vehicle 10 is inside a tunnel using at least one of the image captured by the on-board camera 11, the distance to an object near the vehicle 10 measured by the millimeter wave radar 12, and the map information 13 (step S17).

An image captured inside a tunnel has features unique to the inside of a tunnel. The features unique to the inside of a tunnel include, for example, lights being installed in a row along the edges of the road or on the ceiling, and the lighting being darker than that outside the tunnel during the day. Therefore, the traffic lane marking recognition apparatus 20 can determine whether or not the vehicle 10 is inside a tunnel based on whether or not the image has the features unique to the inside of a tunnel.

In addition, a wall is present to the side of the vehicle 10 inside a tunnel, and therefore, the distance to an object present to the side of the vehicle 10 is shorter than that outside a tunnel. Therefore, the traffic lane marking recognition apparatus 20 can determine whether or not the vehicle 10 is inside a tunnel using the distance measured by the millimeter wave radar 12. Furthermore, the traffic lane marking recognition apparatus 20 can determine whether or not the vehicle 10 is inside a tunnel with high accuracy by associating the current position of the vehicle 10 with the map information 13.

When determined that the vehicle 10 is not inside a tunnel (NO at S17), the traffic lane marking recognition apparatus 20 recognizes the white line candidate detected at step S12 (step S20). A vehicle control unit (not shown) performs driving assistance control of the vehicle 10 based on a white line candidate selected as appropriate from the recognized white line candidates.

Meanwhile, when determined that the vehicle 10 is inside a tunnel (YES at step S17), the traffic lane marking recognition apparatus 20 determines whether or not the white line candidate detected at step S12 has continuity from the predetermined distance before the vehicle 10 is determined to be inside a tunnel until the current point (step S18).

When the white line candidate is identified as being a broken line at step S12 and the white line candidate detected on the same side in relation to the vehicle 10 has been identified as being a solid line before the determination that the vehicle 10 is inside a tunnel, the traffic lane marking recognition apparatus 20 determines that the white line candidate has no continuity.

In addition, when determined that the white line candidate is a line other than a composite line at step S13 and the white line candidate detected on the same side in relation to the vehicle 10 has been identified as being a composite line before the determination that the vehicle 10 is inside a tunnel, the traffic lane marking recognition apparatus 20 determines that the white line candidate has no continuity.

Furthermore, when determined that the white line candidate is a composite line of a predetermined type at step S13 and the white line candidate detected on the same side in relation to the vehicle 10 has been identified as being a composite line of a type differing from the predetermined type before the determination that the vehicle 10 is inside a tunnel, the traffic lane marking recognition apparatus 20 determines that the white line candidate has no continuity.

In addition, when the lane width estimated at step S14 differs so as to exceed the first predetermined value from the lane width estimated before the determination that the vehicle 10 is inside a tunnel, the traffic lane marking recognition apparatus 20 determines that the white line candidate has no continuity.

Furthermore, when the degree of parallel calculated at step S15 is lower so as to exceed the second predetermined value than the degree of parallel calculated before the determination that the vehicle 10 is inside a tunnel, the traffic lane marking recognition apparatus 20 determines that the white line candidate has no continuity.

Still further, when the curvature difference calculated at step S16 differs so as to exceed the third predetermined value from the curvature difference calculated before the determination that the vehicle 10 is inside a tunnel, the traffic lane marking recognition apparatus 20 determines that the white line candidate has no continuity. In cases other than any of the foregoing, the traffic lane marking recognition apparatus 20 determines that the white line candidate has continuity.

Next, when determined that the white line candidate has continuity from a predetermined distance before the vehicle 10 is determined to be inside a tunnel to the current point (YES at step S18), the risk of erroneous recognition of the white line candidate is low, and then, the traffic lane marking recognition apparatus 20 recognizes the white line candidate detected at step S12 (step S20).

Meanwhile, when determined that the white line candidate has no continuity from the predetermined distance before the vehicle 10 is determined to be inside a tunnel to the current point (NO at step S18), the traffic lane marking recognition apparatus 20 suppresses recognition of the white line candidate (step S19). Specifically, when the white line candidate detected on the same side in relation to the vehicle 10 differs in terms of line type inside and outside the tunnel, the traffic lane marking recognition apparatus 20 eliminates the white line candidate from the recognition targets.

In addition, the white line in the center of the road tends to become blurred, and then, the white line candidate of which the line type changes inside and outside the tunnel is often a white line candidate in the center of the road. When the white line candidate has no continuity inside and outside the tunnel in terms of at least any of the lane width, the degree of parallel, and the curvature difference, the traffic lane marking recognition apparatus 20 eliminates the white line candidate in the center of the road from the recognition targets.

Next, the traffic lane marking recognition apparatus 20 recognizes the white line candidate that has not been eliminated from the recognition targets at step S19, among the white line candidates detected at step S12 (step S20).

The traffic lane marking recognition apparatus 20 may calculate the probability of recognition as a white line based on the continuity inside and outside the tunnel, regarding each of the line type of the white line candidate, the lane width, the degree of parallel, and the curvature difference. The traffic lane marking recognition apparatus 20 may then integrate the respective probabilities that have been calculated, and eliminate the white line candidate in the center of the road from the recognition targets when the integrated probability is lower than a predetermined threshold.

According to the first embodiment described above, the following effects are achieved.

When the vehicle 10 is determined to be inside a tunnel, and the line type of a first white line candidate detected inside the tunnel differs from the line type of a second white line candidate identified on the same side as the first white line candidate in relation to the vehicle 10 outside the tunnel near the tunnel entrance, the first white line candidate is eliminated from the recognition targets. As a result, instability of driving assistance control resulting from erroneous recognition of the white line upon entry into a tunnel can be suppressed.

When the vehicle 10 is determined to be inside a tunnel, and the estimated lane width differs so as to exceed the first predetermined value from the lane width estimated outside the tunnel near the tunnel entrance, the white line candidate in the center of the road is eliminated from the recognition targets. As a result, instability of driving assistance control resulting from erroneous recognition of the white line upon entry into the tunnel can be further suppressed.

When the vehicle 10 is determined to be inside a tunnel, and the calculated degree of parallel between the white line candidates is lower so as to exceed the second predetermined value than the degree of parallel calculated outside the tunnel near the tunnel entrance, the white line candidate in the center of the road is eliminated from the recognition targets. As a result, instability of driving assistance control resulting from erroneous recognition of the white line upon entry into the tunnel can be further suppressed.

When the vehicle 10 is determined to be inside a tunnel, and the calculated curvature difference between the left and right white line candidates differs so as to exceed the third predetermined value from the curvature difference calculated outside the tunnel near the tunnel entrance, the white line candidate in the center of the road is eliminated from the recognition targets. As a result, instability of driving assistance control resulting from erroneous recognition of the white line upon entry into the tunnel can be further suppressed.

When a white line candidate determined to be a solid line outside the tunnel near the tunnel entrance is determined to be a broken line inside the tunnel, the likelihood is high that the solid white line inside the tunnel has become blurred into a broken line. Therefore, in such cases, the white line candidate determined to be a broken line inside the tunnel is eliminated from the recognition targets. As a result, erroneous recognition of a white line can be suppressed even when a white line is soiled and blurred inside a tunnel.

When a white line candidate determined to be a composite line outside the tunnel near the tunnel entrance is determined to be a line other than the composite line inside the tunnel, the likelihood is high that the white line that is a composite line inside the tunnel has become blurred into a line other than the composite line. Therefore, in such cases, the white line candidate that has been determined to be a line other than the composite line inside the tunnel is eliminated from the recognition targets. As a result, erroneous recognition of a white line can be suppressed even when a white line is soiled and blurred inside a tunnel.

(Second Embodiment)

A traffic lane marking recognition apparatus 20A according to a second embodiment differs from the traffic lane marking recognition apparatus 20 according to the first embodiment in terms of being able to recognize a portion of a detected white line candidate that can be regarded as a solid line even when a blurred white line candidate for a white line is detected, to improve stability of white line recognition. The white line herein refers to all lane dividing lines (lane markings) that define traffic lanes, including a yellow line. In the second embodiment, components or steps identical with or similar to those in the first embodiment are given the same reference numbers for the sake of omitting unnecessary explanation.

First, the differences from the traffic lane marking recognition apparatus 20 according to the first embodiment in the configuration of the traffic lane marking recognition apparatus 20A according to the second embodiment will be described with reference to FIG. 5. The traffic lane marking recognition apparatus 20A is a computer that includes a CPU, a RAM, a ROM, an I/O, and the like. The traffic lane marking recognition apparatus 20A actualizes each function of the tunnel determining unit 30, a common area determining unit 31, a white line candidate detecting unit 50, a gap detecting unit 55, a broken line determining unit 56, a recognition reducing unit 60A, and a recognizing unit 70A.

The white line candidate detecting unit 50 (candidate detecting unit) extracts the edge points based on the image of the periphery of the vehicle 10 captured by the on-board camera 11, and detects a plurality of left and right white line candidates (lane dividing line candidates) from the extracted edge points.

The common area determining unit 31 determines whether or not the white line candidate detected by the white line candidate detecting unit 50 forms a temporary common area. The temporary common area is a temporary median strip and is generally formed by pole-shaped cones being erected between two yellow solid lines.

For example, the temporary common area is set when only two lanes of a road designed to have four lanes are temporarily shared. For example, when the color of the detected white line candidate is yellow and pole-shaped cones are detected along the detected white line candidate, the common area determining unit 31 determines that the detected white line candidate forms a temporary common area. Alternatively, the common area determining unit 31 determines whether or not the detected white line candidate forms a temporary common area based on the map information 13.

Figure 7:
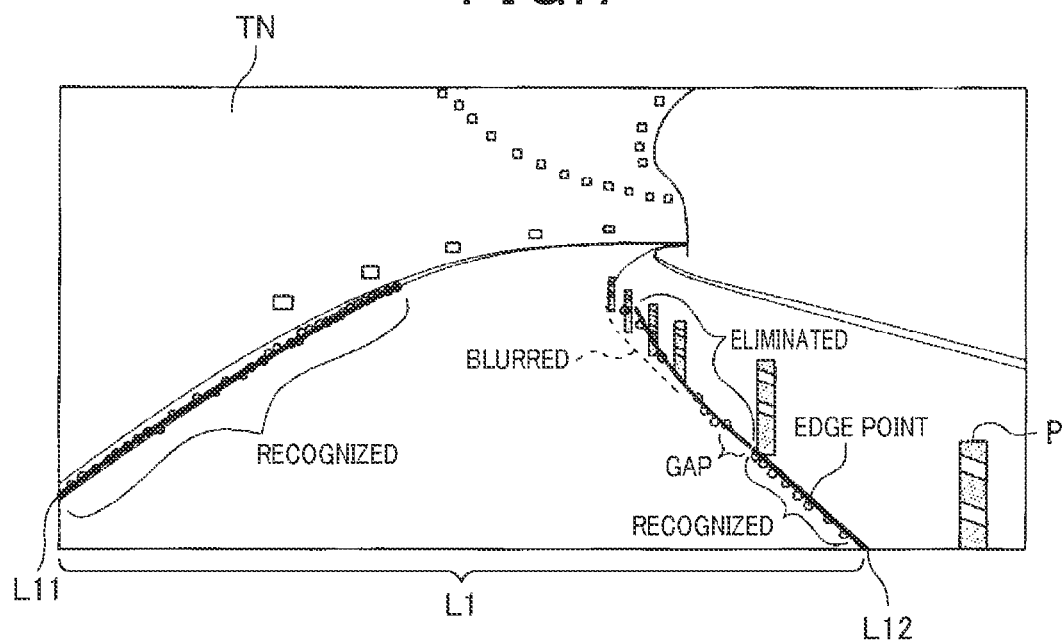
FIG. 7 is a diagram showing white lines recognized inside a tunnel.

The gap detecting unit 55 detects gaps included in the white line candidate detected by the white line candidate detecting unit 50. When a white line becomes blurred, the white line may include a gap which causes the white line to be erroneously recognized. As shown in FIG. 7, the gap is of a distance that is wider than the retrieval interval of the edge points in the vertical direction of the image, and wider than the interval of the edge points that are identified as a solid line.

When the gap detecting unit 55 detects a gap, the recognition reducing unit 60A reduces the probability of recognition of the white line candidate as a white line to a first probability from the end on the vehicle 10 side of the gap closest to the vehicle 10 towards the direction away from the vehicle 10. The first probability is lower than the probability of recognition of a white line candidate in which a gap is not detected as a white line, and is a probability (such as a value near zero) that eliminates the white line candidate from the recognition targets.

When only a white line on one side of a traffic lane is recognized, the white line recognition is dependent on the accuracy of recognition of the white line on one side, and then, white line recognition may become more unstable than when the white lines on both sides of a traffic lane are recognized. Therefore, even when the white line candidate includes a gap, the above-described probability is not reduced regarding a portion of the white line candidate that appears to be a solid line near the vehicle 10.

The above-described probability that is reduced by the recognition reducing unit 60A is the above-described probability related to the white line candidate being a solid line, which is a feature indicating likeness to a white line. The above-described probability is calculated regarding other features indicating the likeness to a white line based on the extent to which the white line candidate has each feature.

In particular, the process by the recognition reducing unit 60A is preferably performed when the common area determining unit 31 determines that the white line candidate forms a temporary common area. When the yellow solid line forming the temporary common area includes a gap, this causes the fluorescent portions of the pole-shaped cones or the like to be erroneously recognized as a white line. Therefore, performing the process by the recognition reducing unit 60A is particularly effective when the white line candidate forms a temporary common area.

In addition, in particular, the process by the recognition reducing unit 60A is preferably performed when the tunnel determining unit 40 determines that the vehicle 10 is inside a tunnel. The white line tends to become blurred inside a tunnel. The pole-shaped cones are often set along the white line inside a tunnel. Therefore, performing the process by the recognition reducing unit 60A is particularly effective when the vehicle 10 is inside a tunnel.

The recognizing unit 70A integrates the probabilities of recognition of the white line candidate as a white line that are calculated for each feature indicating the likeness to a white line, for the white line candidate detected by the white line candidate detecting unit 50, and calculates an integrated probability. The features indicating likeness to a white line includes the white line candidate being a solid line, the lane width being consistent, and the like. The recognizing unit 70A then recognizes a portion of which the integrated probability is higher than a threshold in the white line candidate having the highest likeness to a white line, as a white line.

When the above-described probabilities that are integrated include a probability that has been reduced to the first probability, the integrated probability becomes lower than the threshold. Therefore, the portion of the white line candidate in which the above-described probability has been reduced to the first probability is eliminated from the recognition targets.

Figure 6:
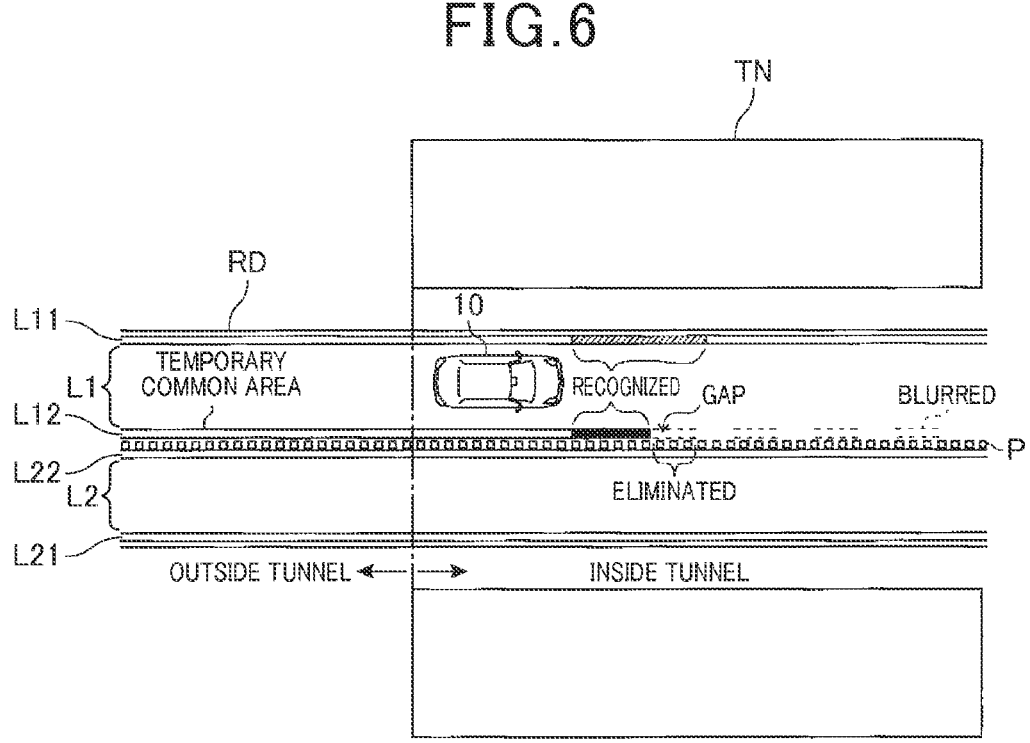
FIG. 6 is a diagram showing white lines recognized inside a tunnel.

As a result, as shown in FIG. 6 and FIG. 7, the white line candidate from the gap closest to the vehicle 10 towards the direction away from the vehicle 10 is eliminated and not recognized. Meanwhile, the portion of the white line candidate up to the gap closest to the vehicle 10, or in other words, the portion of the white line candidate that appears to be a solid line and does not include the gap is recognized as a white line. Therefore, the white lines on both sides can be recognized near the vehicle 10.

Next, a process for recognizing the white line will be described with reference to the flowchart in FIG. 8. The process is repeatedly performed by the traffic lane marking recognition apparatus 20A.

First, the traffic lane marking recognition apparatus 20A acquires an image captured by the on-board camera 11 (step S20). Next, the traffic lane marking recognition apparatus 20A extracts the edge points from the image acquired at step S20 (step S21). Then, the traffic lane marking recognition apparatus 20A performs Hough transform or the like on the edge points extracted at step S21 and calculates a plurality of white line candidates that are candidates for the left and right white lines.

Next, the traffic lane marking recognition apparatus 20A determines whether or not the white line candidate calculated at step S22 includes a gap (step S23). When determined that the white line candidate does not include a gap (NO at step S23), the traffic lane marking recognition apparatus 20A determines that the white line candidate is a candidate for a solid white line (step S24). The traffic lane marking recognition apparatus 20A then recognizes a portion in which recognition is not suppressed in the white line candidate having the highest likeness to a white line as a white line.

Meanwhile, when determined that the white line candidate includes a gap (YES at step S23), the traffic lane marking recognition apparatus 20A suppresses recognition of the white line candidate as a white line from the gap closest to the vehicle 10 towards the direction away from the vehicle 10 (step S25). In other words, the traffic lane marking recognition apparatus 20A reduces the probability of recognition of the white line candidate as a white line from the gap closest to the vehicle 10 towards the direction away from the vehicle 10.

Furthermore, when determined that the white line candidate includes a gap, the traffic lane marking recognition apparatus 20A regards the white line candidate as a candidate for a blurred solid white line (step S26) and does not suppress recognition of the white line candidate as a white line regarding the portion of the white line candidate that appears as a solid line up to the gap closest to the vehicle 10. The traffic lane marking recognition apparatus 20A then recognizes the portion in which recognition is not suppressed in the white line candidate having the highest likeness to a white line, as a white line. The traffic lane marking recognition apparatus 20A then ends the process.

According to the second embodiment described above, the following effects are achieved.

The probability of recognition as a white line is not reduced regarding a portion that appears as a solid line near the vehicle 10 in the detected white line candidate, and the above-described probability is reduced regarding a portion from the gap closest to the vehicle 10 towards the direction away from the vehicle 10. As a result, the white lines on both sides can be recognized near the vehicle 10, and therefore, the stability of white line recognition can be improved while suppressing erroneous recognition of the white line.

When a yellow solid line forming a temporary common area includes a gap, this causes the fluorescent portions of the pole-shaped cones or the like to be erroneously recognized as a white line. Therefore, performing the process by the recognition reducing unit 60A is particularly effective when the white line candidate forms a temporary common area.

When a white line inside a tunnel includes a gap, this causes the fluorescent portions of the pole-shaped cones or the like to be erroneously recognized as a white line. Therefore, performing the process by the recognition reducing unit 60A is particularly effective when the vehicle 10 is inside a tunnel.

(Third Embodiment)

According to the second embodiment, no differentiation is made between when a white line that had originally been configured by a solid line has become blurred to include a gap, and when a white line has originally been configured by a broken line that includes a gap. When the white line candidate includes a gap, the probability of recognition of the white line candidate as a white line is uniformly reduced.

According to a third embodiment, when a white line that had originally been configured by a solid line has become blurred to include a gap, and when a white line has originally been configured by a broken line that includes a gap are differentiated. The probabilities of recognition of the white line candidate as a white line are set to differing values between these two cases. The differences from the second embodiment in the traffic lane marking recognition apparatus 20A according to the third embodiment will hereafter be described. In the third embodiment, components or steps identical with or similar to those in the above embodiments are given the same reference numbers for the sake of omitting unnecessary explanation.

Figure 5:
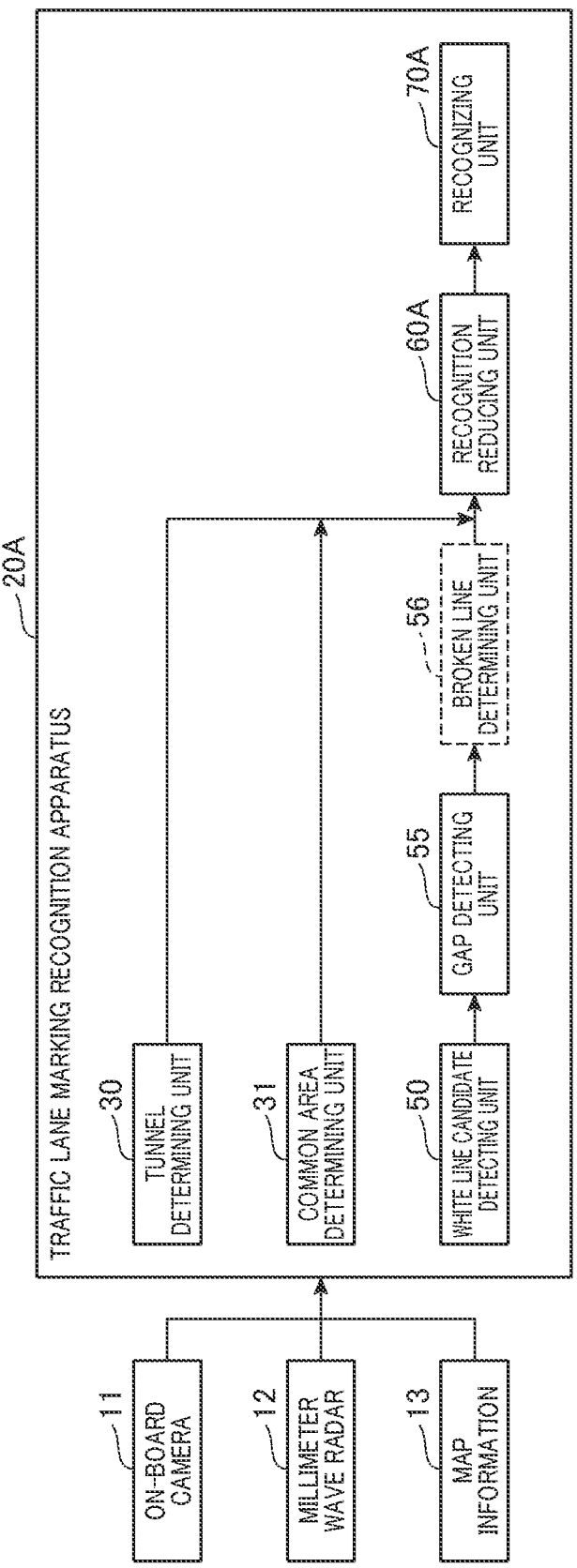
FIG. 5 is a block diagram showing a configuration of a traffic lane marking recognition apparatus according to a second embodiment.

As indicated by the broken line in FIG. 5, the traffic lane marking recognition apparatus 20A according to the third embodiment includes a broken line determining unit 56. When the time or distance over which the gap detecting unit 55 detects that the white line candidate includes a gap exceeds a determination value, the broken line determining unit 56 determines that the white line candidate is a candidate for a white line that has originally been configured by a broken line. In other words, when a plurality of gaps are detected continuously over an amount of time or a distance exceeding the determination value, the broken line determining unit 56 determines that the gaps are not caused by blurring of the white line but are portions in which the white line had not originally been drawn.

When the broken line determining unit 56 determines that the white line candidate is a candidate for a white line that has originally been configured by a broken line, the recognition reducing unit 60A reduces the probability of recognition of the white line candidate as a white line to a second probability. The second probability is lower than the probability of recognition of a white line candidate in which a gap has not been detected as a white line, and is higher than the first probability.

When the white line candidate is a candidate for a white line that has originally been configured by a broken line, the risk of erroneous recognition is lower than when the white line candidate is a candidate for a blurred solid white line, and therefore, the above-described probability is set to be higher than the first probability.

Next, a process for recognizing the white line will be described with reference to the flowchart in FIG. 9.

In the processes at steps S30 to S36, the traffic lane marking recognition apparatus 20A performs processes similar to those at steps S20 to S26 in the flowchart in FIG. 8. Then, the traffic lane marking recognition apparatus 20A starts time measurement (step S37). Time measurement is newly started for each frame. For example, the elapsed time between frames is set to 1. When time measurement is started at the frame at a first point in time, the measured time at the frame at the subsequent second point in time is 1. In addition, the measured time at the frame at the subsequent third point in time is 2, and the measured time of which the second point in time is the starting point is 1.

Next, the traffic lane marking recognition apparatus 20A determines whether or not a measured time that has reached a determination value is present (step S38). When determined that a measured time has not reached the determination value (NO at step S38), the traffic lane marking recognition apparatus 20A temporarily ends the process while retaining the measured times.

Meanwhile, when determined that a measured time that has reached the determination value (YES at step S38), the traffic lane marking recognition apparatus 20A then determines whether or not gaps have been detected in the white line candidate over a period longer than the determination value (step S39).

When determined that gaps have not been detected in the white line candidate over a period longer than the determination value (NO at step S39), the traffic lane marking recognition apparatus 20A regards the white line candidate as a candidate for a blurred solid white line (step S40). In other words, the traffic lane marking recognition apparatus 20A determines that the gap included in the white line candidate is caused by blurring. In this case, the traffic lane marking recognition apparatus 20A performs a process similar to that at step S36.

Meanwhile, when determined that gaps have been detected in the white line candidate over a period longer than the determination value (YES at step S39), the traffic lane marking recognition apparatus 20A determines that the white line candidate is a candidate for a white line that has originally been configured by a broken line (step S41). The traffic lane marking recognition apparatus 20A then calculates the probability of recognition as a white line regarding the white line candidate being a solid line to be the second probability, and recognizes the white line. The traffic lane marking recognition apparatus 20A then ends the process. The distance may be measured instead of time at step S37.

According to the third embodiment described above, the following effects are achieved.

When the time or the distance over which the white line candidate is detected as including gaps exceeds a determination value, the likelihood is high that the gaps are not caused by blurring of the white line and are portions in which the white line had not originally been drawn. Therefore, in this case, the white line candidate can be determined to be a candidate for a white line that has originally been configured by a broken line.

When the white line has originally been configured by a broken line, the risk of erroneous recognition is lower than when the white line has become blurred and appears as a broken line. Therefore, when the white line candidate is a candidate for a white line that has originally been configured by a broken line, the probability of recognition as a white line is set to be higher than that when the white line is a candidate for a white line that has become blurred and appears as a broken line, thereby enabling stable white line recognition.

(Other Embodiments)

According to the first embodiment, recognition of a white line candidate is suppressed based on continuity regarding four features: the line type of the white line candidate, the lane width, the degree of parallel, and the curvature difference. However, recognition of a white line candidate may be suppressed based on continuity regarding at least any one of the four features.

According to the third embodiment, when the gap detecting unit 55 detects gaps in a certain pattern, the broken line determining unit 56 may determine that the white line candidate is a candidate for a white line that has originally been configured by a broken line. Whereas the gaps are detected in a certain pattern when the detected gaps are part of a white line that has originally been configured by a broken line, the gaps are not detected in a certain pattern when the detected gaps are caused by blurring of the white line. Therefore, the white line candidate can be determined to be a candidate for a white line that has originally been configured by a broken line, when the gaps are detected in a certain pattern.

What is claimed is:

1. A traffic lane marking recognition apparatus comprising:
   a candidate detecting unit, using a processor, that detects a lane dividing line candidate which is a candidate for a lane dividing line that defines a traffic lane on a road, based on an image of the road captured by an on-board camera that is mounted in a vehicle;
   a gap detecting unit, using a processor, that detects a gap in the lane dividing line candidate detected by the candidate detecting unit; and
   a recognition reducing unit, using a processor, that when the gap is detected by the gap detecting unit, reduces a probability of recognition of the lane dividing line candidate as a lane dividing line to a first probability that is lower than the probability when the gap detecting unit does not detect the gap, in a region from the gap closest to the vehicle towards a direction away from the vehicle, the probability of recognition defining a probability that the lane dividing line candidate detected by the candidate detecting unit is a lane dividing line of the road,
   wherein recognition of the lane dividing line candidate as the lane dividing line of the road is based on the probability of recognition.

2. The traffic lane marking recognition apparatus according to claim 1, further comprising:
   a broken line determining unit, using a processor, that when a time or distance over which the gap included in the lane dividing line candidate is detected by the gap detecting unit exceeds a predetermined determination value, determines that the lane dividing line candidate is a candidate for the lane dividing line that has originally been configured by a broken line.

3. The traffic lane marking recognition apparatus according to claim 2, wherein:
   when the broken line determining unit determines that the lane dividing line candidate is a candidate for the lane dividing line that has originally been configured by a broken line, the recognition reducing unit reduces the probability of recognition of the lane dividing line candidate as a lane dividing line to a second probability that is lower than the probability when the gap is not detected by the gap detecting unit, and which is higher than the first probability.

4. The traffic lane marking recognition apparatus according to claim 1, further comprising:
   a broken line determining unit, using a processor, that when the gap is detected in a certain pattern by the gap detecting unit, determines that the lane dividing line candidate is a candidate for the lane dividing line that has originally been configured by a broken line.

5. The traffic lane marking recognition apparatus according to claim 1, further comprising:
   a common area determining unit, using a processor, that determines whether or not the lane dividing line candidate detected by the lane dividing line candidate detecting unit forms a temporary common area that is a temporary median strip, wherein the recognition reducing unit performs a process to reduce the probability, when the common area determining unit determines that the lane dividing line candidate forms a temporary common area.

6. The traffic lane marking recognition apparatus according to claim 1, further comprising:

a tunnel determining unit, using a processor, that determines whether or not the vehicle is inside a tunnel, wherein the recognition reducing unit performs a process to reduce the probability, when the tunnel determining unit determines that the vehicle is inside the tunnel.

7. The traffic lane marking recognition apparatus according to claim 6, wherein:

the tunnel determining unit determines whether or not the vehicle is inside a tunnel, using map information.

8. The traffic lane marking recognition apparatus according to claim 6, wherein:

the tunnel determining unit determines whether or not the vehicle is inside a tunnel, using a distance to an object near the vehicle measured by a sensor.

9. The traffic lane marking recognition apparatus according to claim 6, wherein:

the tunnel determining unit determines whether or not the vehicle is inside a tunnel, using an image captured by the on-board camera.

10. The traffic lane marking recognition apparatus according to claim 1, wherein the lane dividing line candidate is eliminated by the recognition reducing unit from among lane dividing line candidates detected by the candidate detecting unit based on the probability of recognition.

11. A traffic lane marking recognition apparatus comprising:

a tunnel determining unit, using a processor, that determines whether or not a vehicle is inside a tunnel;

a detecting unit, using a processor, that detects a lane dividing line candidate that is a candidate for a lane dividing line that defines a traffic lane on a road, based on an image of the road captured by an on-board camera that is mounted in the vehicle;

a line type identifying unit, using a processor, that identifies a line type of the lane dividing line candidate detected by the detecting unit; and a recognition reducing unit, using a processor, that reduces a probability of recognition of a first lane dividing line candidate as a lane dividing line, when the tunnel determining means determines that the vehicle is inside a tunnel, and the line type of the first lane dividing line candidate that is identified by the line type identifying unit differs from the line type of a second lane dividing line candidate that is identified on the same side as the first lane dividing line candidate in relation to the vehicle, from a predetermined distance before the vehicle is determined to be inside the tunnel until the vehicle is determined to be inside the tunnel, the probability of recognition defining a probability that the first lane dividing line candidate detected by the detecting unit is a lane dividing line of the road, wherein recognition of the lane dividing line candidate as the lane dividing line of the road is based on the probability of recognition.

12. The traffic lane marking recognition apparatus according to claim 11, further comprising:

a lane width estimating unit, using a processor, that estimates a lane width from a distance between left-hand and right-hand lane dividing line candidates which were detected by the white line detecting unit, wherein the recognition reducing unit reduces a probability of recognition of a lane dividing line candidate in a center of the road as a lane dividing line, when i) the tunnel determining unit determines that the vehicle is inside the tunnel, and ii) a lane width estimated by the lane width estimating unit differs so as to exceed a first predetermined value from a lane width estimated from a predetermined distance before the vehicle is determined to be inside the tunnel until the vehicle is determined to be inside the tunnel.

13. The traffic lane marking recognition apparatus according to claim 11, further comprising:

a degree-of-parallel calculating unit, using a processor, that calculates a degree of parallel between left-hand and right-hand lane dividing line candidates which were detected by the white line detecting unit, wherein the recognition reducing unit reduces a probability of recognition of a lane dividing line candidate in a center of the road as a lane dividing line, when i) the tunnel determining unit determines that the vehicle is inside the tunnel, and ii) a degree of parallel calculated by the degree-of-parallel calculating unit is lower so as to be lower than a second predetermined value and to be lower than a degree of parallel estimated from a predetermined distance before the vehicle is determined to be inside the tunnel until the vehicle is determined to be inside the tunnel.

14. The traffic lane marking recognition apparatus according to claim 11, further comprising:

a curvature difference calculating unit, using a processor, that calculates a curvature difference between left-hand and right-hand lane dividing line candidates which were detected by the white line detecting unit, wherein the recognition reducing unit reduces a probability of recognition of a lane dividing line candidate in a center of the road as a white line, when i) the tunnel determining unit determines that the vehicle is inside the tunnel, and ii) a curvature difference calculated by the curvature difference calculating unit differs so as to exceed a third predetermined value from a curvature difference calculated from a predetermined distance before the vehicle is determined to be inside the tunnel until the vehicle is determined to be inside the tunnel.

15. The traffic lane marking recognition apparatus according to claim 11, wherein:

the line type identifying unit further performs a process to determine whether the dividing line candidate is a solid line or a broken line, as a process to identify the line type; and the recognition reducing unit reduces a probability of recognition of the first white line candidate as a white line, i) the tunnel determining unit determines that the vehicle is inside the tunnel, and ii) the line type identifying unit determines that a) the first white line candidate is a broken line and b) the second white line candidate is a solid line.

16. The traffic lane marking recognition apparatus according to claim 11, wherein:

the line type identifying unit further performs a process to determine whether or not the dividing line candidate is a composite line, as a process to identify the line type; and the recognition reducing unit reduces a probability of recognition of the first white line candidate as a white line, i) the tunnel determining unit determines that the vehicle is inside the tunnel, and ii) the line type identifying unit determines that a) the first white line candidate is a lane dividing line other than a composite line and b) the second white line candidate is a composite line.

17. A traffic lane marking recognition apparatus comprising:
   a tunnel determining unit, using a processor, that determines whether or not a vehicle is inside a tunnel;
   a detecting unit, using a processor, that detects a lane dividing line candidate that is a candidate for a lane dividing line that defines a traffic lane on a road, based on an image of the road captured by an on-board camera that is mounted in the vehicle;
   a lane width estimating unit, using a processor, that estimates a lane width from left and right lane dividing line candidates detected by the detecting unit; and
   a recognition reducing unit, using a processor, that reduces a probability of recognition of a lane dividing line candidate in the center of the road as a lane dividing line, when the tunnel determining unit determines that the vehicle is inside a tunnel, and the lane width estimated by the lane width estimating means differs so as to exceed a first predetermined value from the lane width estimated from a predetermined distance before the vehicle is determined to be inside a tunnel until the vehicle is determined to be inside the tunnel, the probability of recognition defining a probability that the lane dividing line candidate in the center of the road detected by the candidate detecting unit is a lane dividing line of the road,
   wherein recognition of the lane dividing line candidate in the center of the road as the lane dividing line of the road is based on the probability of recognition.

18. A traffic lane marking recognition apparatus comprising:
   a tunnel determining unit, using a processor, that determines whether or not the vehicle is inside a tunnel;
   a detecting unit, using a processor, that detects a lane dividing line candidate that is a candidate for a lane dividing line that defines a traffic lane on a road, based on an image of the road captured by an on-board camera;
   a degree-of-parallel calculating unit, using a processor, that calculates a degree of parallel between left and right lane dividing line candidates detected by the detecting unit; and
   a recognition reducing unit, using a processor, that reduces a probability of recognition of a lane dividing line candidate in the center of the road as a lane dividing line, when the tunnel determining unit determines that the vehicle is inside a tunnel, and the degree of parallel calculated by the degree-of-parallel calculating means is lower so as to exceed a second predetermined value than the degree of parallel calculated from a predetermined distance before the vehicle is determined to be inside a tunnel until the vehicle is determined to be inside the tunnel, the probability of recognition defining a probability that the lane dividing line candidate in the center of the road detected by the detecting unit is a lane dividing line of the road,
   wherein recognition of the lane dividing line candidate in the center of the road as the lane dividing line of the road is based on the probability of recognition.

19. A non-transitory computer-readable storage medium storing a traffic lane marking recognition program for enabling a computer having one or more processors to function as a traffic lane marking recognition apparatus comprising:
   a candidate detecting unit, using a processor, that detects a lane dividing line candidate which is a candidate for a lane dividing line that defines a traffic lane on a road, based on an image of the road captured by an on-board camera that is mounted in a vehicle;
   a gap detecting unit, using a processor, that detects a gap included in the lane dividing line candidate detected by the candidate detecting unit; and
   a recognition reducing unit, using a processor, that when the gap is detected by the gap detecting unit, reduces a probability of recognition of the lane dividing line candidate as a lane dividing line to a first probability that is lower than the probability when the gap detecting unit does not detect the gap, in a region from the gap closest to the vehicle towards a direction away from the vehicle, the probability of recognition defining a probability that the lane dividing line candidate detected by the candidate detecting unit is a lane dividing line of the road,
   wherein recognition of the lane dividing line candidate as the lane dividing line of the road is based on the probability of recognition.

* * * * *